Feb. 9, 1926.
R. A. MYERS
1,572,671
MAP HOLDER AND MAGNIFIER
Filed Sept. 19, 1924
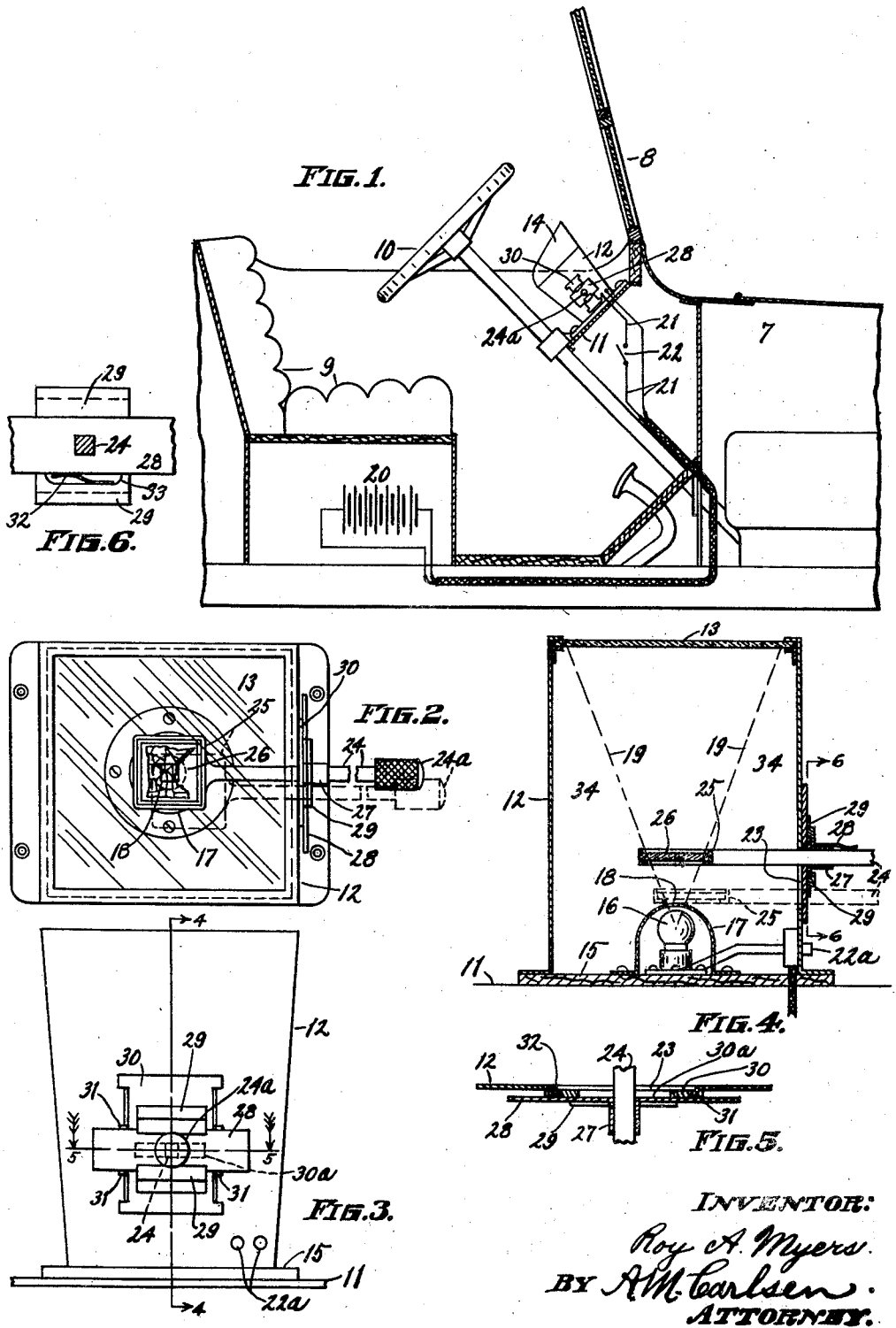

Patented Feb. 9, 1926.

1,572,671

UNITED STATES PATENT OFFICE.

ROY A. MYERS, OF ST. PAUL, MINNESOTA.

MAP HOLDER AND MAGNIFIER.

Application filed September 19, 1924. Serial No. 738,646.

*To all whom it may concern:*

Be it known that I, ROY A. MYERS, a citizen of the United States, residing at St. Paul, in the county of Ramsey and State of Minnesota, have invented certain new and useful Improvements in Map Holders and Magnifiers, of which the following is a specification.

My invention relates to devices for holding road maps on automobiles and other vehicles, and the object is to provide a combined map holder and magnifier by which the entire map or any particular part of it may readily be magnified while held in a convenient position to be observed by the driver of the car.

In the accompanying drawing:

Fig. 1 is a longitudinal vertical section of a portion of an automobile equipped with my map device.

Fig. 2 is a top view of the map holder and map on a much larger scale than in Fig. 1.

Fig. 3 is a right hand side elevation of Fig. 2.

Fig. 4 is a section on line 4—4 in Fig. 3.

Fig. 5 is an enlarged section on line 5—5 in Fig. 3.

Fig. 6 is an enlarged sectional view on the line 6—6 in Fig. 4.

Referring to the drawing by reference numerals, 7 designates an automobile having a wind-shield 8, seat 9, steering wheel 10 and instrument board 11 upon which is detachably or otherwise secured a preferably square inclosure 12 having in its top a ground glass plate 13 around which may be an upright guard 14.

In the bottom 15 of the inclosure is fixed a lamp 16 within a smaller inclosure 17 having in its top an aperture 18 through which the lamp throws light upon the entire glass 13, as indicated by rays 19 (see Fig. 4). The lamp is supplied with electric current from a battery 20 through suitable circuit wires 21 and a switch 22.

The right hand side of the inclosure 12 is arranged at right angles to the glass 13 and is provided with a square aperture 23 of a size suitable for the desired vertical and horizontal movement of an arm 24 on the inner end of which is fixed a small frame 25 in which may be inserted a road map 26 produced upon a translucent film or glass, in small scale, so that the light from the lamp will show it enlarged upon the glass 13 in full view of the person driving the car.

The arm 24 has a finger hold 24ª and is non-rotatable preferably by being square in cross section, and is slidably held in a short tube 27 where a leaf-spring 28, as in Fig. 4, holds it frictionally at any desired point. Said tube 27 is fixed on a horizontal slide 28 which is slidable in grooved guides 29 fixed on a vertical slide 30 slidable in guides 31 fixed on the vertical wall of the inclosure 12 and having a slot 30ª for the arm 24. Each of said slides is frictionally held by a spring arm 32 placed in a cavity 33 as in Fig. 6 or otherwise suitably arranged for preventing accidental movement of the slides.

In the operation of the device, when the operator closes the circuit at switch 22 he will see the map displayed on the glass 13 on a scale enlarged in proportion to the proximity of the map film to the lamp. In cases where he wishes a certain portion of the map especially enlarged and visible on the glass 13 he takes hold of the finger piece 24ª and by sliding the arm 24 and slide 28 he will get any point or part of the map projected on the glass 13 where he may enlarge it by moving the slide 30 downward, or reduce it by moving the slide upward.

Besides the switch 22 I may also use press buttons 22ª, or I may use only said buttons for readily lighting and extinguishing the lamp 16. The guard 14 in Fig. 1 will help keep daylight away from the translucent sight glass 13 and thereby make the picture of the map show more clearly. For a similar purpose the light from the lamp is, by the shield 17, prevented from spreading into the space 34 in Fig. 4, where it may cause reflection under the glass 13.

It will be understood that the present presentation of my invention shows only one embodiment of it while other forms, too numerous to show in one patent, may serve about as well.

What I claim is:

1. A road map holder comprising an inclosure having a translucent sight glass in its top and a lamp in its bottom, and a translucent map smaller than the sight glass interposed between the sight glass and the lamp, and means for readily adjusting the map film in any direction in its own plane, and means for adjusting the film toward and away from the sight glass, and means for holding the adjusting means yieldingly yet firmly against accidental movement.

2. In a device of the class described, an inclosure having a translucent sight glass for displaying a map thereon, a lamp in the inclosure opposite from the sight glass and a frame for holding a miniature film between the lamp and the sight glass, one side of said inclosure having a comparatively large aperture, an arm extending through the aperture and having its inward end fixed to said frame and its outer end provided with a finger hold, a vertically movable slide on the inclosure and covering the aperture and having a transverse slot for the arm, another slide guided on the vertical slide to move across it and having an aperture fitting snugly about the arm holding the map.

3. The structure specified in claim 2, in which said arm is non-rotatable and means for automatically holding the arm and the slides at any point to which they are adjusted.

In testimony whereof I affix my signature.

ROY A. MYERS.